United States Patent
Hirman

(10) Patent No.: US 11,885,080 B2
(45) Date of Patent: Jan. 30, 2024

(54) MATERIAL TRACKING FOR MILLING MACHINES

(71) Applicant: Caterpillar Paving Products Inc., Brooklyn Park, MN (US)

(72) Inventor: Colton J. Hirman, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 845 days.

(21) Appl. No.: 16/923,907

(22) Filed: Jul. 8, 2020

(65) Prior Publication Data

US 2022/0010507 A1     Jan. 13, 2022

(51) Int. Cl.
*E01C 23/088* (2006.01)
*E01C 23/12* (2006.01)
*B65G 41/00* (2006.01)

(52) U.S. Cl.
CPC .......... *E01C 23/088* (2013.01); *E01C 23/127* (2013.01); *B65G 41/002* (2013.01); *B65G 2203/0258* (2013.01); *B65G 2203/042* (2013.01); *E01C 2301/00* (2013.01)

(58) Field of Classification Search
CPC .. E01C 23/088; E01C 23/127; E01C 2301/00; B65G 41/002; B65G 2203/0258; B65G 2203/042; B65G 2814/0344; G01G 11/04
See application file for complete search history.

(56) References Cited

U.S. PATENT DOCUMENTS

| | | | |
|---|---|---|---|
| 10,024,708 B2 | 7/2018 | Marsolek et al. | |
| 10,227,739 B2 | 3/2019 | Laugwitz et al. | |
| 10,308,440 B2 | 6/2019 | Marsolek et al. | |
| 2007/0284215 A1* | 12/2007 | Rudge | B65G 41/002 198/313 |
| 2009/0267402 A1* | 10/2009 | Berning | E01C 23/088 198/581 |
| 2013/0334864 A1* | 12/2013 | Jorgensen | B65G 41/002 299/39.2 |
| 2016/0137422 A1* | 5/2016 | Husar | B65G 41/002 299/39.2 |
| 2016/0177521 A1* | 6/2016 | Laugwitz | E01C 23/088 299/1.5 |
| 2017/0044729 A1* | 2/2017 | Lee | B65G 15/24 |
| 2017/0102283 A1* | 4/2017 | Marsolek | B65G 43/00 |
| 2019/0144208 A1* | 5/2019 | Hirman | B65G 21/14 198/313 |

FOREIGN PATENT DOCUMENTS

WO     2015034497     3/2015

* cited by examiner

*Primary Examiner* — Abby J Flynn
*Assistant Examiner* — Michael A Goodwin
(74) *Attorney, Agent, or Firm* — Schwegman Lundberg & Woessner, P.A.

(57) ABSTRACT

A milling machine includes a cutting rotor, a foldable conveyor, a sensor, and a controller. The cutting rotor is configured to mill material beneath the milling machine. The foldable conveyor is configured to receive and dispose the milled material and includes a first section and a second section foldable with respect to the first section at a fold structure. The sensor is positioned on the milling machine and configured to sense a value indicative of a force acting on the second section. The controller is configured to determine an amount of the milled material within the second section of the foldable conveyor using the value indicative of the force.

19 Claims, 4 Drawing Sheets

MATERIAL TRACKING FOR MILLING MACHINES

TECHNICAL FIELD

The present application relates generally to milling machines. More particularly, the present application relates to tracking of milled material for milling machines.

BACKGROUND

Milling machines, such as cold planer machines, include a class of construction machines that are configured to process paving material, such as by scarifying, removing, or reclaiming such material from the surface of a paved road. These machines can include a frame having a rotary cutting tool for processing the paving material, and two or more tracks or wheel units for propelling the cold planer machine forward. The processed paving material is deposited by the milling rotor onto a conveyor, or series of conveyors, that transport the material away from the machine and to a nearby haul vehicle for transportation away from the jobsite.

U.S. Pat. No. 10,227,739 B2 discloses a payload monitoring system where a tensile force is measured at the connection of the conveyor to the machine. This may be done through load pins or through a hydraulic cylinder.

SUMMARY OF THE INVENTION

In one example, a method for tracking an amount of milled material for a milling machine includes milling paving material using a cutting rotor of the milling machine; providing the milled material to a foldable conveyor of the milling machine, the foldable conveyor comprising a first section and a second section foldable with respect to the first section at a fold structure; sensing, via a sensor positioned on the milling machine, a value indicative of a force acting on the second section; and determining, via a controller, the amount of milled material using the value indicative of the force acting on the second section.

In another example, a system for tracking a load for a milling machine includes a sensor and a controller. The sensor is positioned on the milling machine. The milling machine includes a folding conveyor that includes a first section and a second section foldable with respect to the first section at a fold structure. The sensor is configured to sense a value indicative of a force acting on the second section. The controller is configured to determine an amount of material within the foldable conveyor using the value indicative of the force acting on the second section while the milling machine is milling the material.

In another example, a milling machine includes a cutting rotor, a foldable conveyor, a sensor, and a controller. The cutting rotor is configured to mill material beneath the milling machine. The foldable conveyor is configured to receive and dispose the milled material and includes a first section and a second section foldable with respect to the first section at a fold structure. The sensor is positioned on the milling machine and configured to sense a value indicative of a force acting on the second section. The controller is configured to determine an amount of the milled material within the second section of the foldable conveyor using the value indicative of the force.

DETAILED DESCRIPTION

Figure 1:
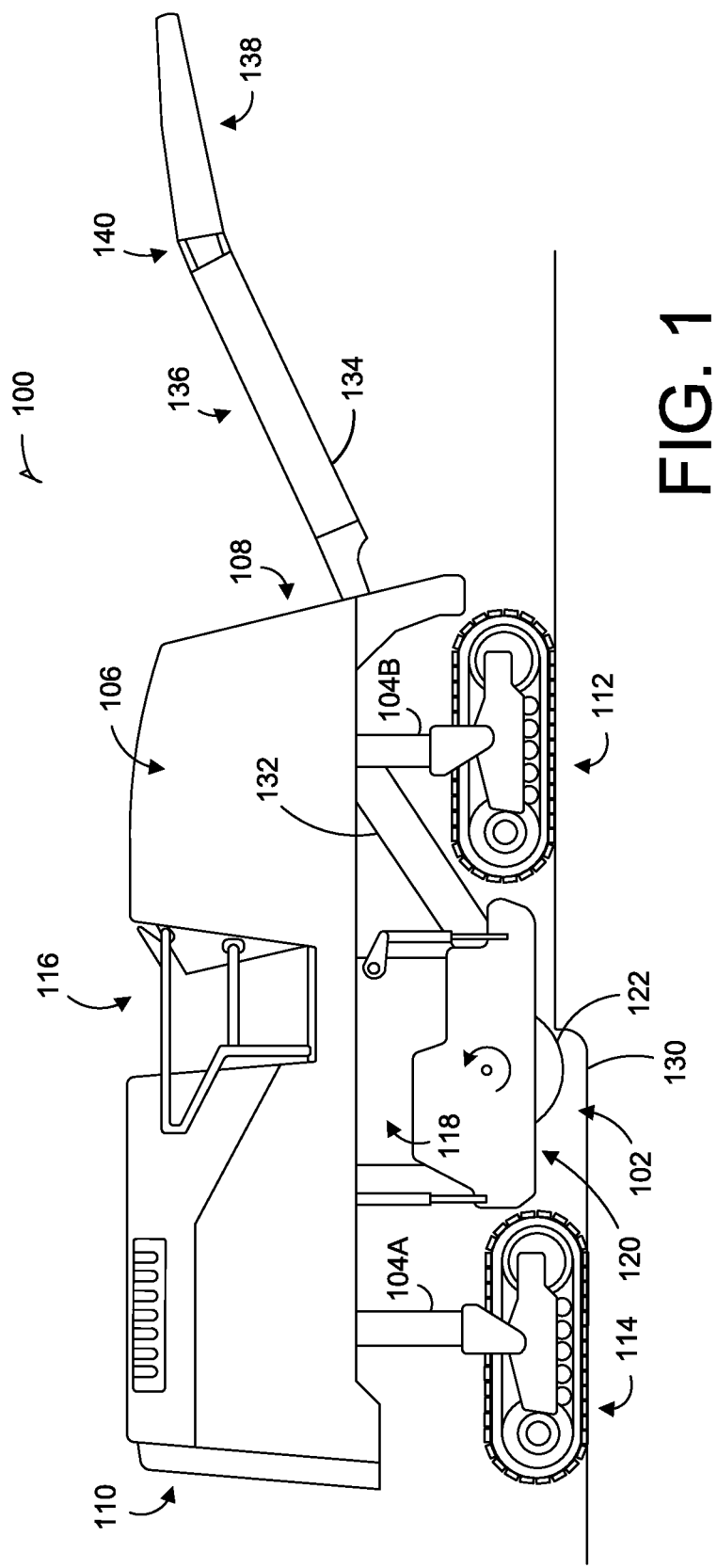
FIG. 1 is a schematic side view of a milling machine.

FIG. 1 is a schematic side view of a cold planer machine 100. The cold planer machine 100 may also be referred to as a milling machine. The cold planer machine 100 includes a cutting system 102, legs 104A and 104B, and a frame 106. The frame 106 includes a front frame end 108 and a back frame end 110. The cold planer machine 100 also includes front propulsion elements 112 and back propulsion elements 114, which can be coupled to frame 106 proximate the front frame end 108 and the back frame end 110, respectively. Each of the propulsion elements 112 and 114 can include two parallel ground engaging tracks, although the present disclosure is not thereby limited. An operator control station 116 can be coupled to frame 106 and can include one or more control systems (shown in FIG. 3) for performing control and monitoring functions of the cold planer machine 100.

The cutting system 102 can be coupled to the frame 106 and can include a housing 118 defining a cutting chamber 120 for a milling rotor 122. The legs 104A and 104B, which may be telescoping or otherwise configured to extend and retract, can be provided to raise and lower the housing 118, including the chamber 120 with the milling rotor 122, typically in conjunction with adjustments to a desired cutting depth of the cutting system 102. Cutting system 102 can include a cutting tool, such as the milling rotor 122, that can rotate in a direction counter to a forward travel direction of cold planer machine 100, for example. The milling rotor 122 can be fixed within the housing 118 and configured to cut material of mat or substrate 130 underlying the cold planer machine 100. The milling rotor 122 may include a plurality of cutting bits mounted thereon, for example, to engage the mat or substrate 130, which may be fragmented by the cutting action of the bits.

A primary conveyor 132 can be positioned to feed material cut from the substrate 130 via the milling rotor 122 to a secondary conveyor 134 projecting forward of the front frame end 108. The secondary conveyor 134, which may be a foldable conveyor, can deposit removed substrate 130 into a receptacle, such as the box of a dump truck. For example, the secondary conveyor 134 may be equipped with a conveyor belt rotating around the secondary conveyor 134 facilitating transport of excavated material to the discharged location. The secondary conveyor 134 includes a first conveyor section 136 and a second conveyor section 138, foldable with respect to the first conveyor section 136 through a fold structure 140. The first conveyor section 136 may also be foldable with respect to the front frame end 106. Folding of the secondary conveyor 134 may be used for spatial efficiency during transport of the cold planer machine 100, for example.

Figure 2:
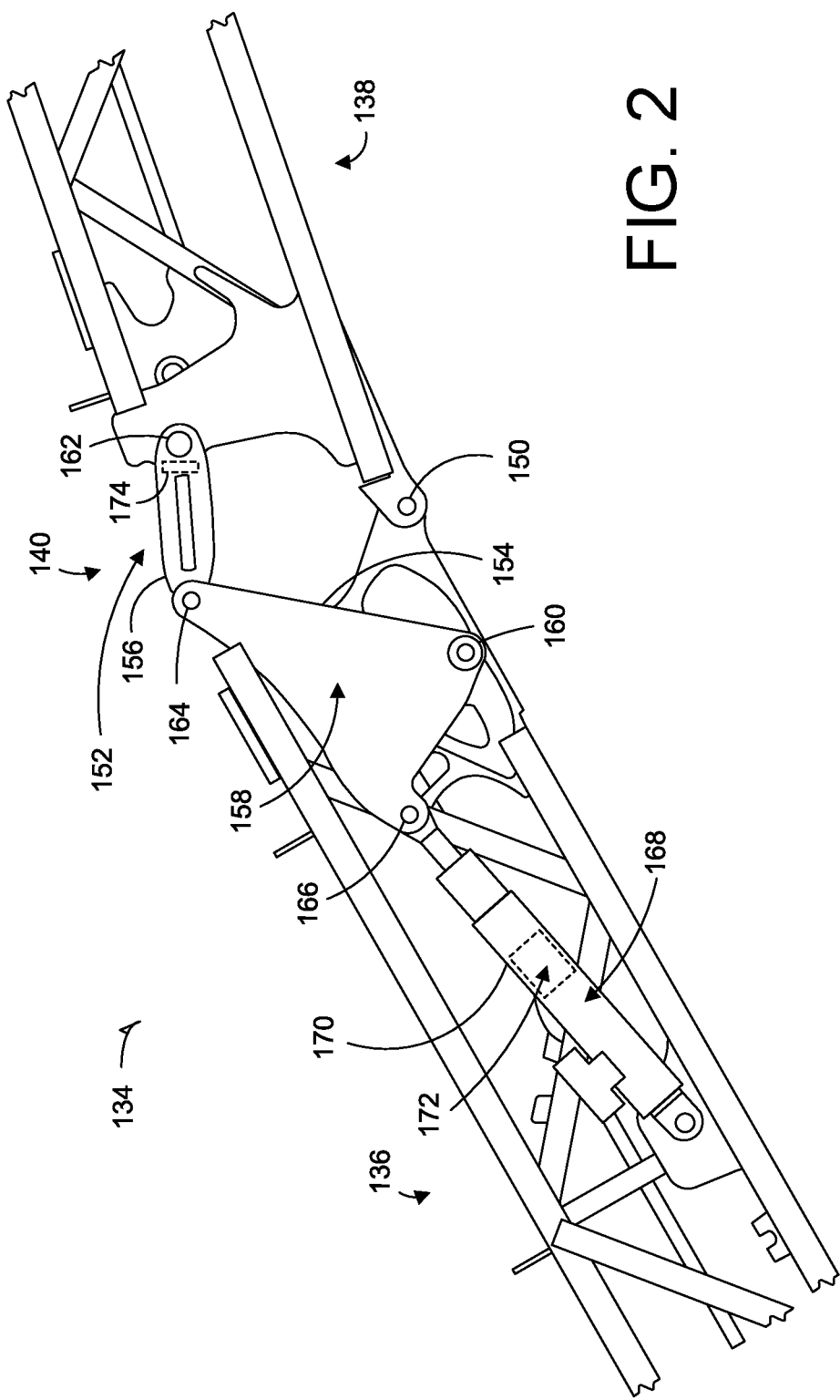
FIG. 2 is a diagram illustrating a conveyor fold structure for a foldable conveyor of a milling machine

It may be desirable to know how much material of the substrate 130 is removed during operation of the cold planer machine 100. To accomplish this, one or more sensors may be positioned within or near the secondary conveyor 134 to sense data indicative of the load through the secondary conveyor 134. For example, one or more sensors may be positioned at or near the fold structure 140 to sense a pressure, torque, or other value indicative of a force acting on the second section 138. Knowing the force acting on the second section 138, the present load in the second section 138 may be determined. In this example, the force acting on the second section 138 may be sampled at periodic intervals, such as every second, to determine the load through the second section 138 over a time period, such as the duration of a milling job, or the duration of loading a dump truck, for example. This may be useful in identifying when FIG. 2 is a diagram illustrating an example embodiment of the fold structure 140 of the secondary conveyor 134. In other examples, the fold structure 140 may be implemented using any other structure. The first conveyor section 136 is pivotally connected to the second conveyor section 138. For example, a pivotal coupling 150 between the first conveyor section 136 and the second conveyor section 138 allows the second conveyor section 138 to articulate about the first conveyor section 136. The pivotal coupling 150 may be of any appropriate design, such as, for example, a pivot rod and corresponding apertures.

The fold structure 140 may also include a rocker mechanism 152, which, along with portions of the first and second conveyor sections 136 and 138 provides a four-bar linkage arrangement to facilitate movement of the second conveyor section 138 about the pivotal coupling 150. The rocker mechanism 152 is coupled to the first conveyor section 136 and the second conveyor section 138. The rocker mechanism 152 facilitates movement of the secondary conveyor 134 to both a deployed position and a stowed position.

The rocker mechanism 152 may include a first link 154, a second link 156, and a mechanical advantage amplifier 158. A first end of the first link 154 is pivotably coupled to the first conveyor section 136 at a first pivot point 160. The second link 156 is pivotably coupled to the second conveyor section 138 at a second pivot point 162. The first and second links 154 and 156 are pivotably coupled at a third pivot point 164. In this way, the first and second links 154 and 156 and portions of the first and second conveyor sections 136 and 138 form a four-bar linkage. More specifically, the first conveyor section 136 between the pivotal coupling 150 and the first pivot point 160, the first link 154, the second link 156, and the second conveyor section 138 between the second pivot point 162 and the pivotal coupling 150 form the four bars of a four-bar linkage.

In order to facilitate control of the four-bar linkage, the rocker mechanism 152 further includes the mechanical advantage amplifier 158. The mechanical advantage amplifier 158 is connected or secured with the first link 154. It will be appreciated that the mechanical advantage amplifier 158 may be unitarily formed with the first link 154. In the illustrated embodiment, for example, the mechanical advantage amplifier 158 and the first link 154 are formed as a triangularly shaped plate.

The mechanical advantage amplifier 158 includes a fourth pivot point 166, which is spaced from the first link 154, that is, an axis connecting the first and third pivot points 160 and 164. In order to facilitate movement of the rocker mechanism 152, the conveyor fold structure 140 further includes at least one actuator 168 coupled to the mechanical advantage amplifier 158 at the fourth pivot point 166. The actuator 168 may be selectively actuated, applying a force at the fourth pivot point 166 to provide pivoting movement of the rocker mechanism 152, and, accordingly, the second conveyor section 138. While the actuator 168 may be any type of actuator, the actuator 168 of the illustrated embodiment is a hydraulic cylinder 170. The hydraulic cylinder 170 is pivotably coupled at one end to the fourth pivot point 166, and pivotably coupled at the other end to the first conveyor section 136.

To facilitate sensing of the load through the second conveyor section 138, sensors may be positioned at one or more points near or within the fold structure 140. For example, a pressure sensor 172 may be positioned within the hydraulic cylinder 170 to sense a pressure indicative of the load on the hydraulic cylinder 170, which can be used to identify a force acting on the second conveyor section 138 by the material within the second conveyor section 138.

One or more strain gauges 174 may also be positioned on links, at pivots, or at other locations within the fold structure 140. While illustrated on the second link 156, the strain gauge(s) 174 may be positioned at any other point within the fold structure 140, such as on the first link 154. The strain gauge 174 may be used to sense a force on the second link 156 using an electrical resistance, for example, created by the second conveyor section 138. The force on the second link 156 may be used to identify a present force acting on the second conveyor section 138, which may be used to determine an amount of material within the second conveyor section 138.

One or more load pins may also be used at any of the pivots or joints of the fold structure 140. For example, a load pin may be used at the pivotal coupling 150. The load pin may include one or more strain gauges, for example, configured to measure a value such as torque or other force on the pivotal coupling 150 caused by the second conveyor section 138. This value may be used to identify a present force acting on the second conveyor section 138, which may be used to determine an amount of material within the second conveyor section 138. One or more load pins may also be used at any of the other pivots points 160, 162, 164, and 166, for example.

Figure 3:
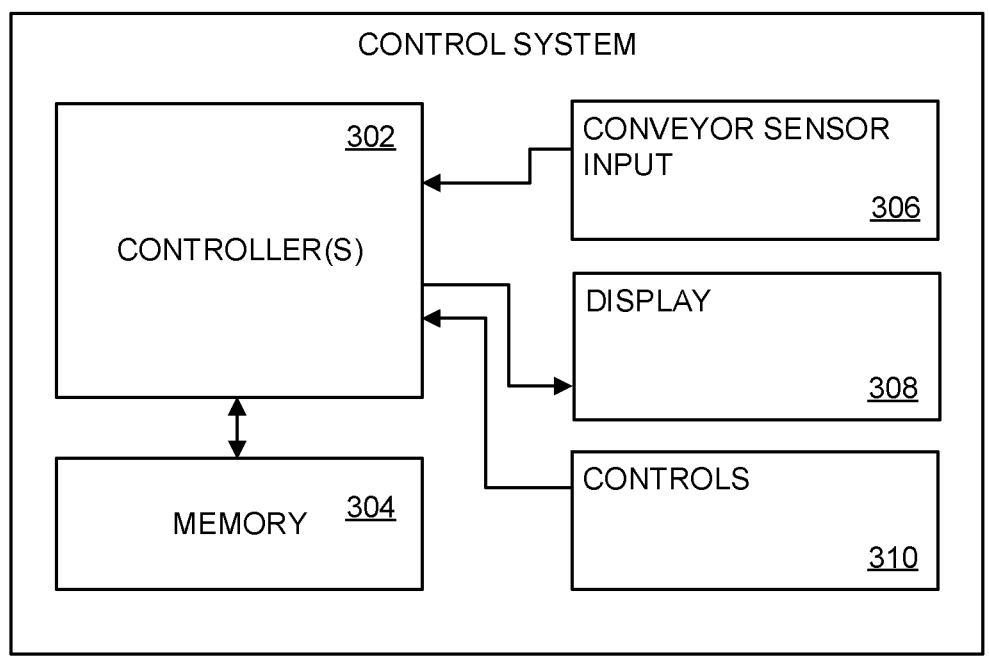
FIG. 3 is a block diagram illustrating a control system for a milling machine.

FIG. 3 is a is a block diagram illustrating a control system 300 for a cold planer machine, such as the cold planer machine 100. The control system 300 includes one or more controllers 302, memory 304, conveyor sensor input 306, display 308, and controls 310. The controls 310 can be operated by an operator positioned at the operator control station 116, such as to control the operation of the cold planer machine 100. The display 308 or other output device can also be positioned at the operator control station 116 to provide output to an operator. In an example, the controls 310 and the display 308 may be a single device, such as a touchscreen, for example.

The controller 302 and memory 304 can include, for example, software, hardware, and combinations of hardware and software configured to execute several functions related to control of the cold planer machine 100. The controller 302 can include an analog, digital, or combination analog and digital controller including a number of components. As examples, the controller 302 can include integrated circuit boards or ICB(s), printed circuit boards PCB(s), processor(s), data storage devices, switches, relays, or any other components. Examples of processors can include any one or more of a microprocessor, a controller, a digital signal processor (DSP), an application specific integrated circuit (ASIC), a field-programmable gate array (FPGA), or equivalent discrete or integrated logic circuitry.

The memory 304 may include storage media to store and/or retrieve data or other information such as, for example, signals from the pressure sensor 172, the strain gauges 174, load pins, or other sensors positioned at or near the fold structure 140. Storage devices, in some examples, are described as a computer-readable storage medium. The memory 304 can be used to store program instructions for execution by processor(s) of the controller 302, for example. The memory 304, for example, are used by software, applications, algorithms, as examples, running on and/or executed by the controller 302. The memory 304 can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random access memories (DRAM), static random access memories (SRAM), and other forms of volatile memories known in the art.

The conveyor sensor input 306 may be derived from or configured to provide sensed data from one or more sensors positioned at or near the fold structure 140, such as the pressure sensor 172, strain gauges 174, load pins, or other sensors, for example. The controller 302 may use this input to carry out methods of determining an amount of material passing through the secondary conveyer 134 during operation of the cold planer machine 100, for example, to identify an amount of material milled by the cold planer machine 100.

Prior to milling material, the controller 302 may be configured to "zero out" or tare the input from the conveyor sensor input 306 when the second conveyor 134 is carrying no material to calibrate the sensor. For example, the controller 302 can sample the value from the conveyor sensor input 306 when no material is in the secondary conveyor 134. This value may be used as a baseline value during milling to determine an amount of material milled by the cold planer machine 100. For example, during milling, the baseline value can be subtracted from the value from the conveyor sensor input 306 to obtain a force acting on the second conveyor section 138 indicative of the milled material within the second conveyor section 138.

The controller 302 may determine a load through the second conveyor section 138 based on present forces identified acting on the second conveyor section 138 when material is passing through the second conveyor 134. For example, the input from the conveyor sensor input 306 may be sampled periodically, such as every second, or at any other desirable interval, to monitor the forces on the second conveyor section 138 over time. These forces may then be used to determine the load through the second conveyor section 138.

The relationship between the forces acting on the second conveyor section 138 and the amount of material within the second conveyor section 138 may be determined through prior testing, through forces observed during operation of the cold planer machine 100, or in any other manner. For example, a known amount of material may be passed through the second conveyor 134 and the values from the conveyor sensor input 306 may be monitored to establish a relationship. This relationship may also be temporal in nature. For example, the value from the conveyor sensor input 306 may be sampled periodically while a known flow of material is passing through the second conveyor 134 to obtain a force profile or other correlation for the material flowing through the second conveyor 134 over a specified time period. This relationship can then be utilized by the controller 302, for example, to determine an amount of material flowing through the second conveyor 134 during milling by the cold planer machine 100.

INDUSTRIAL APPLICABILITY

Figure 4:
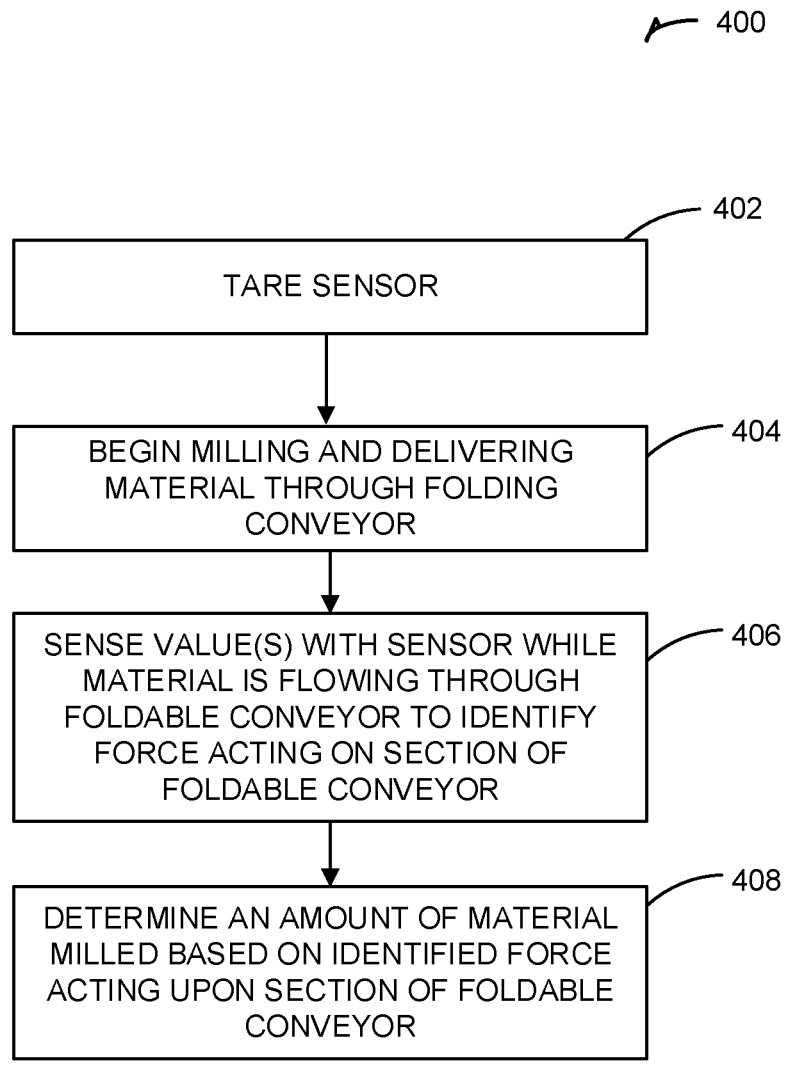
FIG. 4 is a flowchart illustrating a method of tracking milled material over time for a milling machine.

In one illustrative example, the cold planer machine 100 may be a Caterpillar® PM622 cold planer machine with a foldable conveyor. FIG. 4 is a flowchart illustrating a method 400 of monitoring an amount of material milled by a cold planer machine over a specified time. At step 402, a sensor positioned at or near a fold structure of the foldable conveyor is "zeroed" or tared. The sensor value is read while no milled material is in the foldable conveyor and is used as a baseline value during milling. The sensor may be a pressure sensor, strain gauge, load pin, or the like positioned at or near the fold structure of the foldable conveyor. At step 404, the cold planer machine 100 begins milling material. The material is milled from the surface beneath the cold planer machine 100 and passed through the foldable conveyor for disposal into a truck, for example. At step 406, while the material is being milled, the sensor positioned at or near the fold structure of the foldable conveyor senses one or more values indicative of a force/torque/pressure acting on a section of the foldable conveyor. Data from the sensor may be sampled periodically at a specified rate, for example. At step 408, a controller uses the sensed value(s) to determine an amount of material milled.

Method 400 provides a low-cost solution for monitoring an amount of material milled during a job. One or more sensors may be added to the fold structure of the foldable conveyor to provide an accurate measurement of the material milled during a job. This value can be used to accurately monitor an amount of material delivered to a truck, a total amount of material milled at a jobsite, or an amount of material milled over any other time period.

The above detailed description is intended to be illustrative, and not restrictive. The scope of the disclosure should, therefore, be determined with references to the appended claims, along with the full scope of equivalents to which such claims are entitled.

What is claimed is:

1. A method for tracking an amount of milled material for a milling machine, the method comprising:
   milling paving material using a cutting rotor of the milling machine to form the milled material;
   providing the milled material to a foldable conveyor of the milling machine, the foldable conveyor comprising a first section and a second section foldable with respect to the first section at a fold structure that forms a pivoting joint between the first section and the second section;
   sensing, via a sensor positioned at the fold structure, a value indicative of a force acting on the second section of the foldable conveyor; and
   determining, via a controller, the amount of the milled material using the value indicative of the force acting on the second section.

2. The method of claim 1, wherein the fold structure comprises a hydraulic cylinder, and wherein the sensor is positioned within the hydraulic cylinder.

3. The method of claim 2, wherein sensing, via the sensor, comprises sensing a pressure in the hydraulic cylinder using a pressure sensor.

4. The method of claim 1, wherein the fold structure comprises one or more links connected between the first section and the second section to facilitate folding of the foldable conveyor, and wherein sensing via the sensor comprises sensing a force on the one or more links.

5. The method of claim 4, wherein the sensor comprises one or more strain gauges positioned on the one or more links.

6. The method of claim 4, wherein the one or more links are connected between the first section and the second section by one or more pivot points, and wherein the sensor comprises one or more load pins positioned at the one or more pivot points.

7. The method of claim 1, further comprising calibrating the sensor when no milled material is in the second section of the foldable conveyor prior to milling the paving material.

8. A system for tracking a load for a milling machine, the system comprising:
- a sensor, wherein the milling machine comprises a foldable conveyor that comprises a first section and a second section foldable with respect to the first section at a fold structure, and wherein the sensor is positioned on the fold structure and is configured to sense a value indicative of a force acting on the second section; and
- a controller configured to determine an amount of material within the foldable conveyor using the value indicative of the force acting on the second section while the milling machine is milling the material.

9. The system of claim 8, wherein the fold structure comprises a hydraulic cylinder, and wherein the sensor is positioned within the hydraulic cylinder.

10. The system of claim 9, wherein the sensor is a pressure sensor configured to sense a pressure in the hydraulic cylinder as the value indicative of the force acting on the second section.

11. The system of claim 8, wherein the fold structure comprises one or more links connected between the first section and the second section to facilitate folding of the foldable conveyor, and wherein the sensor is positioned to sense a force on the one or more links.

12. The system of claim 11, wherein the sensor comprises one or more strain gauges positioned on the one or more links.

13. The system of claim 11, wherein the one or more links are connected between the first section and the second section by one or more pivot points, and wherein the sensor comprises one or more load pins positioned at the one or more pivot points.

14. The system of claim 8, wherein the controller is further configured to calibrate the sensor when no milled material is in the second section of the foldable conveyor prior to the milling machine milling the material.

15. A milling machine comprising:
- a cutting rotor configured to mill material beneath the milling machine;
- a foldable conveyor configured to receive and dispose the milled material, the foldable conveyor comprising a first section and a second section foldable with respect to the first section at a fold structure, wherein the fold structure comprises one or more links connected between the first section and the second section;
- a sensor positioned on the fold structure to sense a force on the one or more links and configured to sense a value indicative of a force acting on the second section; and
- a controller configured to determine an amount of the milled material within the second section of the foldable conveyor using the value indicative of the force.

16. The milling machine of claim 15, wherein the fold structure comprises a hydraulic cylinder, and wherein the sensor is positioned within the hydraulic cylinder.

17. The milling machine of claim 16, wherein the sensor is a pressure sensor configured to sense a pressure in the hydraulic cylinder as the value indicative of the force.

18. The milling machine of claim 15, wherein the sensor comprises one or more strain gauges positioned on the one or more links.

19. The milling machine of claim 15, wherein the one or more links are connected between the first section and the second section by one or more pivot points, and wherein the sensor comprises one or more load pins positioned at the one or more pivot points.

\* \* \* \* \*